United States Patent
Bu et al.

(10) Patent No.: US 11,578,856 B2
(45) Date of Patent: Feb. 14, 2023

(54) LIGHTING LAMP, LIGHTING MODULE AND LENS WITH SAWTOOTH REFLECTIVE SURFACE

(71) Applicant: OPPLE LIGHTING CO., LTD., Shanghai (CN)

(72) Inventors: Chenxi Bu, Shanghai (CN); Yisheng Xiao, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/136,306

(22) Filed: Dec. 29, 2020

(65) Prior Publication Data

US 2021/0116103 A1    Apr. 22, 2021

Related U.S. Application Data

(63) Continuation of application No. PCT/CN2019/106267, filed on Sep. 17, 2019.

(30) Foreign Application Priority Data

Sep. 17, 2018 (CN) .......................... 201811083205.5
Sep. 17, 2018 (CN) .......................... 201821519064.2

(51) Int. Cl.
*F21V 13/04* (2006.01)
*F21V 5/04* (2006.01)
(Continued)

(52) U.S. Cl.
CPC .............. *F21V 13/04* (2013.01); *F21V 5/04* (2013.01); *F21V 7/048* (2013.01); *F21V 23/003* (2013.01);
(Continued)

(58) Field of Classification Search
CPC .......... F21V 5/002; F21V 5/04; F21V 7/0091; G02B 19/0028; G02B 19/0071
See application file for complete search history.

(56) References Cited

U.S. PATENT DOCUMENTS 7,347,590 B2 *   3/2008   Lee ..................... G02B 19/0071
                                                          362/327
7,637,639 B2 *  12/2009   Epstein .................. H01L 33/58
                                                          362/23.1
(Continued)

FOREIGN PATENT DOCUMENTS

CN    101341601 A    1/2009
CN    204240274 U    4/2015
(Continued)

OTHER PUBLICATIONS

International Search Report (including English translation) and Written Opinion issued in PCT/CN2019/106267, dated Dec. 17, 2019, 6 pages.

*Primary Examiner* — Oluseye Iwarere
*Assistant Examiner* — Michael Chiang
(74) *Attorney, Agent, or Firm* — Arch & Lake LLP

(57) ABSTRACT

A lighting lamp is provided. The lighting lamp includes a light module and a lens. The lens includes a lens body, provided with a first end and a second end which are opposite to each other and a side wall located between the first end and the second end, in which a light source of the lighting lamp is arranged at the first end, and at least a portion of the side wall is configured as a light emitting component. The lens also includes a light incident component, arranged at the first end of the lens body, in which the light incident component irradiates light emitted by the light source to the second end. The lens includes a light reflecting component, arranged at the second end of the lens body.

9 Claims, 8 Drawing Sheets

(51) Int. Cl.
*F21V 7/04* (2006.01)
*F21V 23/00* (2015.01)
*G02B 19/00* (2006.01)
*F21Y 115/10* (2016.01)

(52) U.S. Cl.
CPC ..... *G02B 19/0028* (2013.01); *G02B 19/0071* (2013.01); *F21Y 2115/10* (2016.08)

(56) References Cited

U.S. PATENT DOCUMENTS

| | | | | |
|---|---|---|---|---|
| 8,523,407 | B2* | 9/2013 | Huang | F21K 9/61 |
| | | | | 362/327 |
| 9,435,504 | B2* | 9/2016 | Durand | F21S 41/322 |
| 10,139,095 | B2* | 11/2018 | Yoder | F21V 13/08 |
| 2006/0067640 | A1* | 3/2006 | Hsieh | G02B 6/0018 |
| | | | | 385/146 |
| 2006/0245083 | A1* | 11/2006 | Chou | G02B 19/0071 |
| | | | | 359/726 |
| 2008/0123349 | A1* | 5/2008 | Chaves | G02B 3/06 |
| | | | | 362/329 |
| 2011/0157898 | A1* | 6/2011 | Kanai | F21V 7/0091 |
| | | | | 362/311.06 |
| 2012/0044700 | A1* | 2/2012 | Chen | F21V 7/0091 |
| | | | | 362/311.02 |
| 2014/0001945 | A1* | 1/2014 | Yamamoto | F21V 7/0091 |
| | | | | 313/111 |

FOREIGN PATENT DOCUMENTS

| | | |
|---|---|---|
| CN | 205424486 U | 8/2016 |
| CN | 108980779 A | 12/2018 |
| CN | 208652459 U | 3/2019 |
| JP | 2012048950 A | 3/2012 |
| TW | 200706799 A | 2/2007 |

\* cited by examiner

LIGHTING LAMP, LIGHTING MODULE AND LENS WITH SAWTOOTH REFLECTIVE SURFACE

CROSS-REFERENCE TO RELATED APPLICATIONS

This application is based upon and claims the priority of PCT patent application No. PCT/CN2019/106267 filed on Sep. 17, 2019 which claims priority to the Chinese patent application No. 201821519064.2 filed on Sep. 17, 2018 and the Chinese patent application No. 201811083205.5 filed on Sep. 17, 2018, the entire content of all of which is hereby incorporated by reference herein for all purposes.

TECHNICAL FIELD

The present disclosure relates to a technical field of lighting, and more particularly, to a lens for a lighting lamp, and further relates to a lighting module comprising the lens and the lighting lamp.

BACKGROUND

Taking a candle bulb for example, the candle bulb is used for being installed in a lampshade of a crystal ceiling lamp or a marble ceiling lamp and so on, and the candle bulb lights up the crystal ceiling lamp or the marble ceiling lamp through downward light emission.

SUMMARY

The present disclosure provides a lens for a lighting lamp.

According to a first aspect, the present disclosure provides a lens for a lighting lamp. The lens may include a lens body, provided with a first end and a second end which are opposite to each other and a side wall located between the first end and the second end, in which a light source of the lighting lamp is arranged at the first end, and at least a portion of the side wall is configured as a light emitting component; a light incident component, arranged at the first end of the lens body, in which the light incident component irradiates light emitted by the light source to the second end; and a light reflecting component, arranged at the second end of the lens body, in which the light reflecting component comprises a concave part with an inner surface being a sawtooth surface, the concave part is concave from the first end to the second end, the sawtooth surface includes a plurality of extension surfaces surrounding an axis of the lens body and sequentially intersecting, at least one of the extension surfaces extends in a direction from the first end to the second end, and two adjacent extension surfaces totally reflect light from the light incident component to the light emitting component.

According to a second aspect, the present disclosure provides a lighting module. includes a lens, a light source arranged at a first end of the lens and a substrate for fixing the light source. The lens includes a lens body, provided with a first end and a second end which are opposite to each other and a side wall located between the first end and the second end, wherein a light source of the lighting lamp is arranged at the first end, and at least a portion of the side wall is configured as a light emitting component; a light incident component, arranged at the first end of the lens body, wherein the light incident component irradiates light emitted by the light source to the second end; and a light reflecting component, arranged at the second end of the lens body, wherein the light reflecting component comprises a concave part with an inner surface being a sawtooth surface, the concave part is concave from the first end to the second end, the sawtooth surface comprises a plurality of extension surfaces surrounding an axis of the lens body and sequentially intersecting, at least one of the extension surfaces extends in a direction from the first end to the second end, and two adjacent extension surfaces totally reflect light from the light incident component to the light emitting component.

According to a third aspect, the present disclosure provides a lighting lamp. The lighting lamp includes a lighting module, a light emitting mask located above the lighting module, a base under the lighting module, a drive circuit arranged in the base and a lamp holder arranged below the base and electrically connected with the lighting module, the lighting module a lens, a light source arranged at a first end of the lens, and a substrate for fixing the light source. The lens includes a lens body, provided with a first end and a second end which are opposite to each other and a side wall located between the first end and the second end, wherein a light source of the lighting lamp is arranged at the first end, and at least a portion of the side wall is configured as a light emitting component; a light incident component, arranged at the first end of the lens body, wherein the light incident component irradiates light emitted by the light source to the second end; and a light reflecting component, arranged at the second end of the lens body, wherein the light reflecting component comprises a concave part with an inner surface being a sawtooth surface, the concave part is concave from the first end to the second end, the sawtooth surface comprises a plurality of extension surfaces surrounding an axis of the lens body and sequentially intersecting, at least one of the extension surfaces extends in a direction from the first end to the second end, and two adjacent extension surfaces totally reflect light from the light incident component to the light emitting component, and the lens is located between the light emitting mask and the base and assembled to the light emitting mask and the base respectively or the lens is located in the light emitting mask.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terminology used in the present disclosure is for the purpose of describing particular examples only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Some candle bulbs use lenses to increase the proportion of downward light emission, but the proportion of the downward light emission may be only about 30%. If it is necessary to further improve the proportion of the downward light emission, electroplating treatment needs to be conducted on the lenses, and a coating layer made of a reflecting material is used for reflecting light rays so as to increase the proportion of the downward light emission. However, in a case that the lenses are electroplated, the cost is increased, meanwhile, the coating layer will gradually break away along with time increasing, which makes influence on the optical effect.

Figure 2:
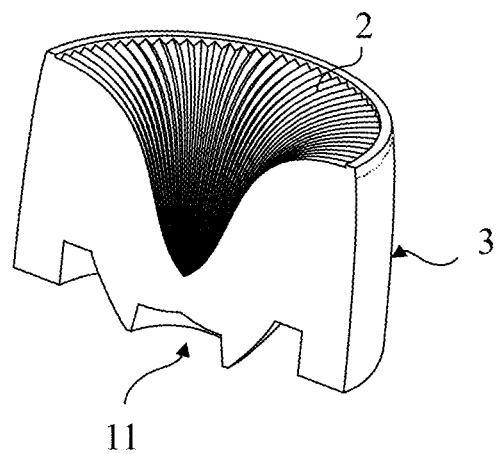
FIG. 2 is a stereoscopic sectional view of the lens according to an example of the present disclosure.
Figure 3:
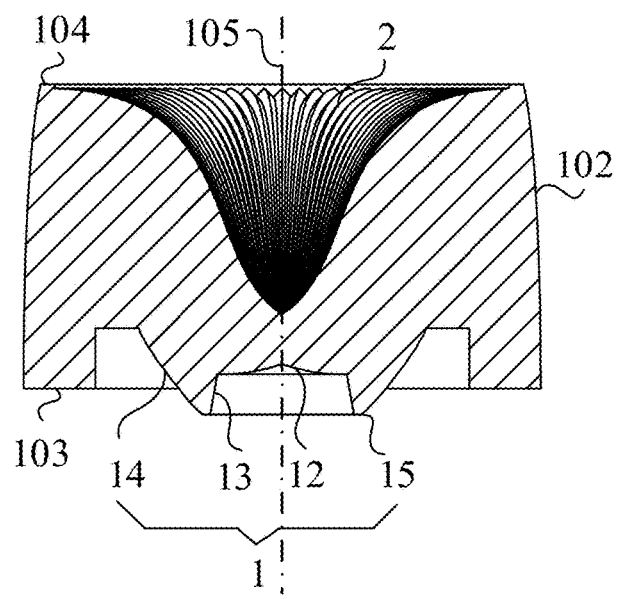
FIG. 3 is a plane sectional view of the lens according to an example of the present disclosure.
Figure 4:
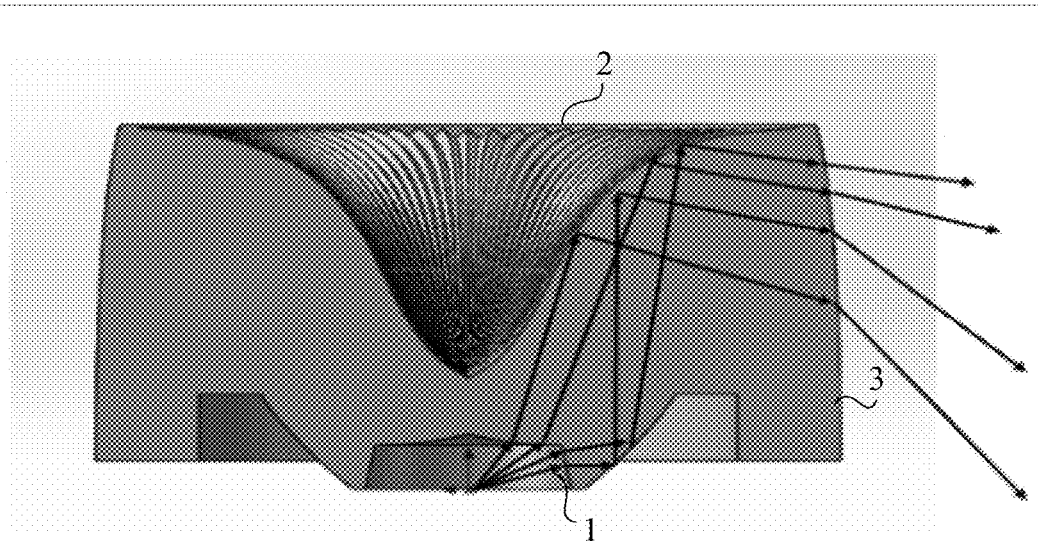
FIG. 4 is a schematic diagram of an optical path of the lens according to an example of the present disclosure.

As illustrated in FIG. 1 to FIG. 4 (an arrow in FIG. 4 shows the path of light transmission), a lens 100 according to the first example of the present disclosure is used for a lighting lamp, for example a candle bulb. The lens 100 comprises a cylindrical lens body 101 or a conical lens body 101, a light incident component 1 and a light reflecting component 2 arranged at two ends of the lens body 101 respectively, and a light emitting component 3 arranged at a side of the lens body 101.

The lens body 101 is provided with a side wall 102 and further provided with a first end and a second end which are located at two ends of the side wall 102, the first end is provided with a first end surface 103 intersecting with the side wall 102, and the second end is provided with a second end surface 104 intersecting with the side wall 102. The side wall 102 is formed by rotating a straight line or an arc line around an axis 105 of the lens body.

Figure 1:
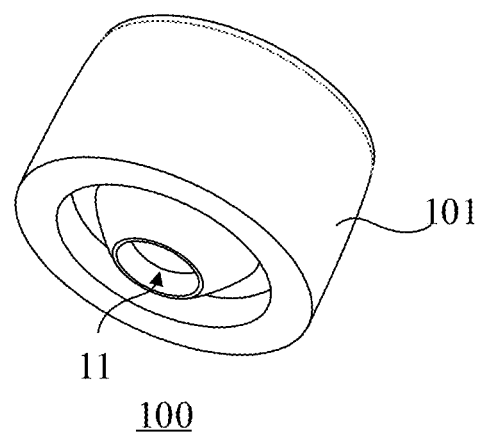
FIG. 1 is a structural schematic diagram of a lens according to an example of the present disclosure.

The light incident component 1 is arranged at the first end of the lens body 101. The light incident component 1 comprises a light source accommodation groove 11 for accommodating a light source 200 of a lighting lamp. The light source accommodation groove 11 comprises a groove wall 13 located at the side and an upper end surface 12 towards the second end of the lens body 101. The upper end surface 12 is a rotation surface formed in the manner that a line rotates around the axis 105 of the lens body 101, and one end of the line is located on the axis 105 of the lens body 101. After the light source 200 is fixed in the light source accommodation groove 11, the axis of the light source 200 is located on the axis 105 of the lens body 101, so as to realize a total reflection by the light reflecting component 2 and facilitate to control light. The upper end surface 12 is a convex surface (as illustrated in FIG. 1 to FIG. 3) protruding toward the second end of the lens body 101, and accordingly the light can deflect towards a center of the lens body 101.

The groove wall 13 surrounds the upper end surface 12, and the groove wall 13 can be a light transmitting groove wall 13. In this situation, the light incident component 1 further comprises a reflecting surface 14 located at a side of the light source accommodation groove 11, and the light is reflected to the light reflecting component 2 by the reflecting surface 14. The reflecting surface 14 is located between the light source accommodation groove 11 and the side wall 3 of the lens body 101 (as illustrated in FIG. 4), the structure is simple, and it is convenient to control light.

The light incident component 1 extends beyond the first end surface 103, and an installing surface 15 protruding toward the first end is formed by the lower end surface. A substrate 300 of the lighting lamp is arranged on the installing surface 15. Through the arrangement, the structure is simple, and it is convenient to install.

The light reflecting component 2 is arranged at the second end of the lens body 101, the lens body 101 is provided with a concave part 21 formed by extending along a direction from the second end surface 104 to the first end surface 103, the concave part 21 is in an inverted cone shape, and a sawtooth surface 22 is distributed on the inner surface of the concave part 21. The sawtooth surface 22 comprises a plurality of extension surfaces 23 surrounding the axis 105 of the lens body 101 and sequentially intersecting, and each of the extension surfaces 23 extends in the direction from the first end surface 103 of the lens body 101 to the second end surface 104 of the lens body 101. Light emitted by the light source 200 passes through the light incident component 1 firstly and then irradiates to the light reflecting component 2 after being gathered by the light incident component 1, and the light irradiating to the light reflecting component 2 irradiates to the light emitting component 3 after being totally reflected by the two adjacent extension surfaces 23.

Figure 5:
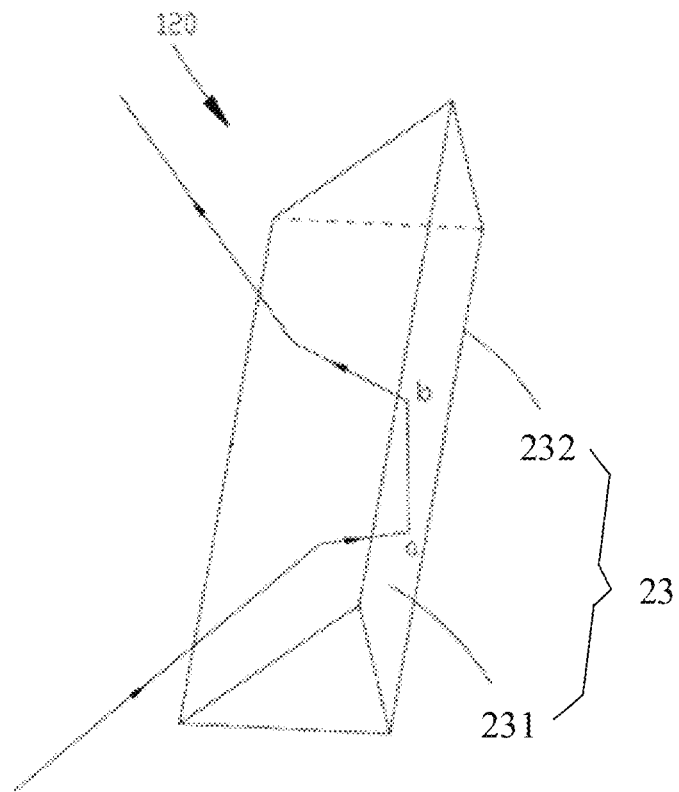
FIG. 5 is a light path schematic diagram in a vertical direction between a first extension surface and a second extension surface according to an example of the present disclosure.
Figure 6:
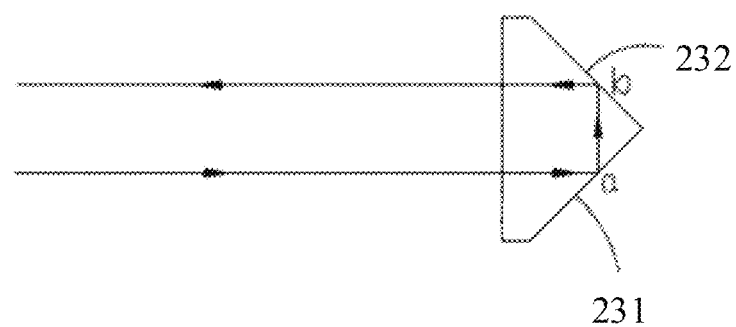
FIG. 6 is a light path schematic diagram in a horizontal direction between a first extension surface and a second extension surface according to an example of the present disclosure.
Figure 7:
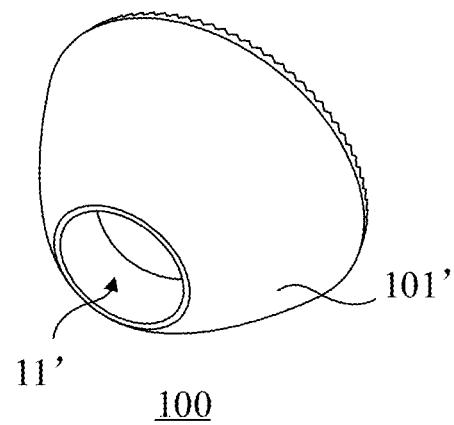
FIG. 7 is a schematic diagram of a lens in a first direction according to an example of the present disclosure.
Figure 8:
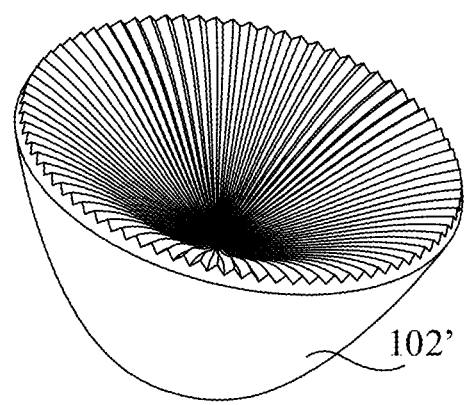
FIG. 8 is a schematic diagram of the lens in a second direction according to an example of the present disclosure.
Figure 9:
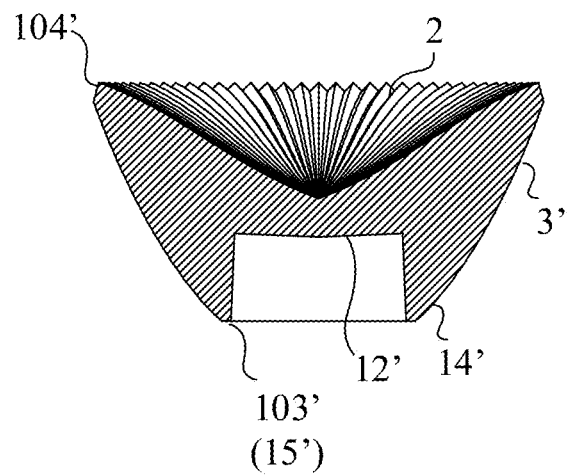
FIG. 9 is a sectional view of the lens according to an example of the present disclosure.
Figure 10:
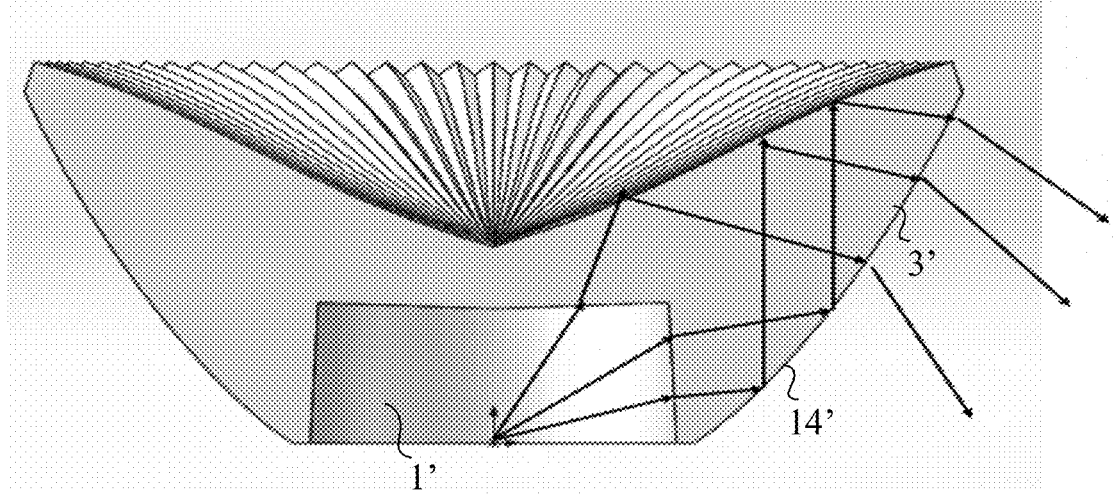
FIG. 10 is a light path schematic diagram of the lens according to an example of the present disclosure.

In which, as illustrated in FIG. 5 and FIG. 6 (the arrow shows the path of light transmission), the light path passing through the two adjacent extension surfaces 23 is that the light incidents to a point a of the first extension surface 231 through the light incident component 1, the light is totally reflected to a point b of the second extension surface 232 and then the light is totally reflected to the light emitting component 3 through the second extension surface 232. For the first extension surface 231 and the second extension surface 232 which are intersected, from the top view, in a case that the light irradiates to the point a of the first extension surface 231, the light can be reflected to the point b of the second extension surface 232 according to a total reflection principle and then the light is reflected from the point b of the second extension surface 232, and finally the relationship between the emitted light and the incident light is in accordance with the total reflection angle relation.

Usually, the total reflection is achieved in the lens 100, the incident angle between the light and the light reflecting component 2 needs to be large enough, otherwise, the light can be transmitted out, and the angle will vary depending on the material of the lens 100. If the sawtooth surface 22 is not arranged, in a case that the light arrives at the second end the incident angle cannot reach the total reflection angle, and the transmission is formed. After the sawtooth surface 22 is arranged, in a case that the light arrives at the point a of the first extension surface 231, the incident angle is larger than a critical angle of total reflection, and the total reflection is realized. Thus, by arranging the sawtooth surface 22, light irradiating to the second end of the lens body 101 can be emitted with an optical effect of the total reflection. Thus, by arranging the sawtooth surface 22, the luminous efficiency is improved, the cost is reduced and the service life is prolonged without the electroplating treatment; and an outer surface of the lens 100 is uniform, the bright sense can be formed by the light reflecting component 2, and the design sense of the product can be embodied.

All the extension surfaces 23 are the same in shape. The two adjacent extension surfaces 23 are perpendicular to each other, and in other words, an included angle between the two adjacent extension surfaces 23 is 90 degrees. The intersecting line of the two adjacent extension surfaces 23 is a generatrix of the concave part 21, and in other words, the two adjacent extension surfaces 23 are symmetric relative to the plane extending along the axis 105 of the lens body 101. In this way, the total reflection optical effect formed by the light reflecting component 2 is a mirror total reflection optical effect, that is, the light incident angle is equal to the light emitting angle, and it is convenient to control light.

At least a portion of light emitted by the light emitting component inclines towards the first end to form the lower luminescence, so that the lens 100 can be applied to a candle bulb and so on. In an arrangement manner of the light reflecting component 2, the generatrix of the concave part 21 is an arc line. The axis of the concave part 21 coincides with the axis 105 of the lens body 101. In the direction from the first end of the lens body 101 to the second end of the lens body 101, included angles between the extension surfaces and the axis of the lens body are gradually increased, and a minimum included angle between the extension surfaces and the axis of the lens body is less than 45 degrees, and a maximum included angle between the extension surfaces and the axis of the lens body is greater than 45 degrees. Through such an arrangement, the lens 100 is installed in the candle bulb, and in a case that the candle bulb is applied to a crystal ceiling lamp or a marble ceiling lamp and so on, light emitted from the candle bulb can better light up the crystal ceiling lamp or the marble ceiling lamp.

Inclination angles of various parts of the sawtooth surface 22 can be set according to the requirements. The shape of the concave part 21 can be set according to requirements.

The side walls 102 located between the first end surface 103 and the second end surface 104 are all configured as the light emitting component 3. The light emitted from the light emitting component 3 is refracted. The lens 100 may be a plastic lens 100 to increase the texture, and the lens 100 serves as a part of a light emitting mask 400. Of course, the lens 100 may also be a glass lens and so on.

As illustrated in FIG. 7 to FIG. 10, the lens according to the second example of the present disclosure is different from the lens according to the first example in that a side wall 102' of a lens body 101' in the second example is a curved surface, and an inclination degree of the side wall 102' in the second example is larger than an inclination degree of the side wall 102 in the first example. An installing surface 15' of a light source accommodation groove 11' is flush to a first end surface 103', and an upper end surface 12' of the light source accommodation groove 11' is a plane. The side wall 102', close to the first end surface 103', of the lens body 101' serves as a reflecting surface 14' of a light incident component 1', and a reflecting surface 14' can be formed by plating a reflecting layer on the side wall 102' of the lens body 101'. The side wall 102', close to the second end surface 104', of the lens body 101' is configured as a light emitting component 3'. A height, a shape and the like of the light reflecting component 2' can be adjusted according to the light incident component 1' and the light emitting component 3'.

It should be noted that, the light incident component 1 and the light incident component 1' are different in forming manner, the shape, the size, the inclination degree, the low point and the like of the concave part 21 and the concave part 21' can be correspondingly adjusted, and accordingly light can be reflected to a required region through the concave part 21 and the concave part 21'.

Of course, in other examples, the upper end surface of the light source accommodation groove can be a convex surface protruding toward the second end surface, and a portion of the side wall of the lens body serves as the reflecting surface and the like.

Figure 11:
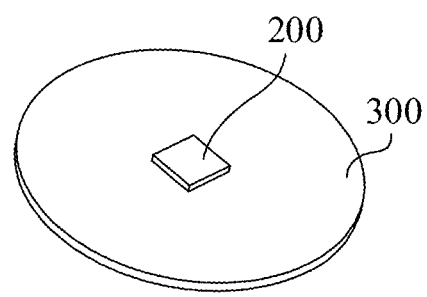
FIG. 11 is a stereoscopic combination diagram of a light source module according to an example of the present disclosure.

A lighting module according to the present disclosure comprises a lens 100, a light source 200 arranged at the first end of the lens 100 and a substrate 300 (as illustrated in FIG. 11) for fixing the light source 200, and the lens 100 is the above lens 100. In the lighting module, the light emitting efficiency is improved and the cost is reduced without the electroplating treatment. The light source 200 can be an LED (Light Emitting Diode) light source.

Figure 12:
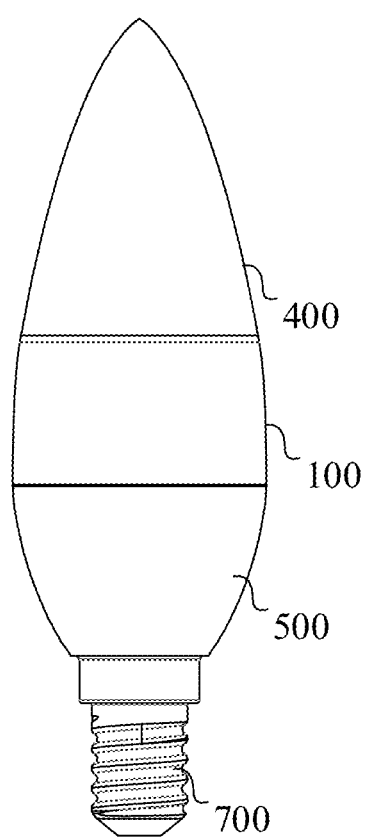
FIG. 12 is a structural schematic diagram of a lighting lamp according to an example of the present disclosure.
Figure 13:
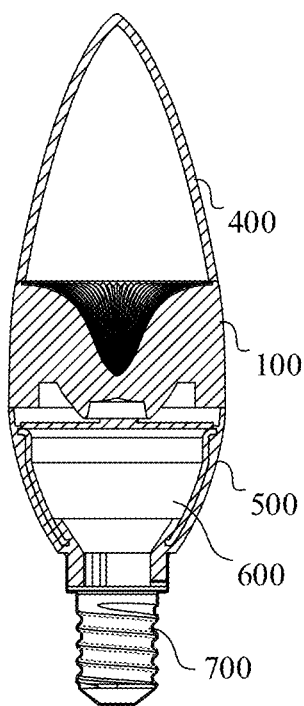
FIG. 13 is a structural sectional view of the lighting lamp according to an example of the disclosure.
Figure 16:
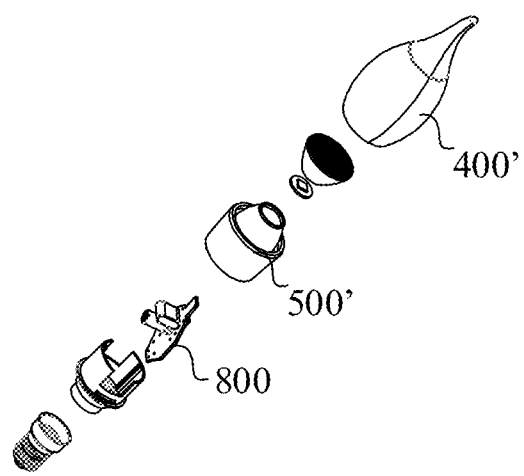
FIG. 16 is a structural explosion diagram of the lighting lamp according to an example of the present disclosure.

As illustrated in FIG. 12 and FIG. 13, the lighting lamp in the third example of the present disclosure can be a candle bulb, and the lighting lamp includes a lighting module, a light emitting mask 400 located above the lighting module, a base 500 under the lighting module, a drive module 800 (as illustrated in FIG. 16) arranged in the base 500, and a lamp holder 700 arranged below the base 500 and electrically connected with the lighting module, in which the lighting module is the above mentioned lighting module, and the lens 100 is located between the light emitting mask 400 and the base 500 and assembled to the light emitting mask 400 and the base 500 respectively. The drive module 800 is electrically connected with the light source module, and the drive module 800 can be fixed in the base 500 and can also be integrated and fixed to the substrate 300 of the light source module. The base 500 can be a double-layer aluminum-coated plastic structure or a double-layer plastic-coated aluminum structure. The lighting lamp can further include, for example, a drive power source 600. The drive module, for example, may be a drive circuit.

In the lighting lamp, the luminous efficiency is improved, the cost is reduced and the service life is prolonged without the electroplating treatment, and the lighting lamp is novel in arrangement, attractive in appearance and convenient to machine. The substrate 300 can be connected with the base 500 in a buckle manner or a bonding manner. The light emitting mask 400 can be a transparent mask and can also be a solid mask or an electroplated mask, so that the texture is enhanced, and the shape of the light emitting mask 400 can be changed according to requirements.

Figure 14:
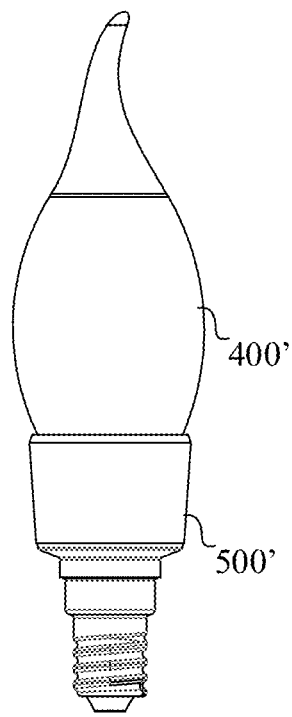
FIG. 14 is a structural schematic diagram of a lighting lamp according to an example of the present disclosure.
Figure 15:
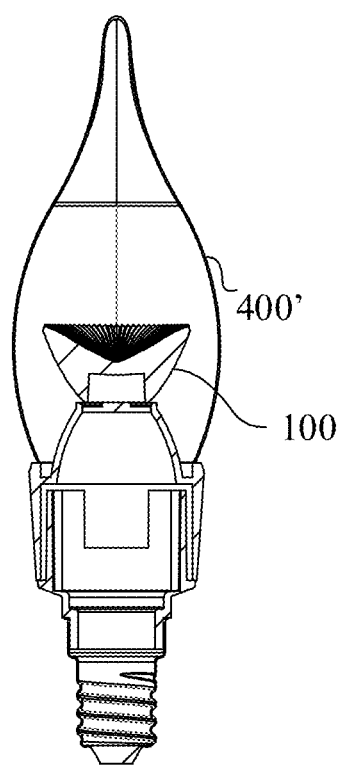
FIG. 15 is a structural sectional diagram of the lighting lamp according to an example of the present disclosure.

A fourth example of the present disclosure is different from the third example in that, as illustrated in FIG. 14 to FIG. 16, a lens 100 is located in a light emitting mask 400', and diversity of the lighting lamp is achieved. A size of the lens 100 is small, and a base 500' stretches into the light emitting mask 400' so as to support the lens 100.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above descriptions are only examples of the present disclosure, and are not used to limit the present disclosure. For those skilled in the art, the present disclosure may have some improvements and modifications. The modifications, equivalent substitutions, and improvements, which are made within the technical spirit and principle of the present disclosure, should be within the protection scope of claims of the present disclosure.

What is claimed is:

1. A lens for a lighting lamp, comprising:
   a lens body, provided with a first end and a second end which are opposite to each other and a side wall located between the first end and the second end, wherein a light source of the lighting lamp is arranged at the first end, and at least a portion of the side wall is configured as a light emitting component;
   a light incident component, wherein the light incident component comprises a light source accommodation groove for accommodating the light source, the light source accommodation groove comprises a groove wall located at a side portion and an upper end surface towards the second end, the upper end surface is a rotation surface disposed in a manner that a line rotates around an axis of the lens body, and one end of the line is located on the axis of the lens body, arranged at the first end of the lens body, wherein the light incident component irradiates light emitted by the light source to the second end; and
   a light reflecting component, arranged at the second end of the lens body, wherein the light reflecting component comprises a concave part with an inner surface being a sawtooth surface, the concave part is concave from the first end to the second end, a cross-section of the inner surface of the concave part from the axis to the side wall is first concave up towards the second end of the lens body and then concave down towards the first end of the lens body, the sawtooth surface comprises a plurality of extension surfaces surrounding the axis of the lens body and sequentially intersecting, at least one of the extension surfaces extends in a direction from the first end to the second end, and two adjacent extension surfaces totally reflect light from the light incident component to the light emitting component, wherein any light emitted by the light emitting component is refracted towards the first end, such that all the light is refracted towards the first end of the lens body.

2. The lens according to the claim 1, wherein the two adjacent extension surfaces are perpendicular to each other, and an intersection line of the two adjacent extension surfaces is a generatrix of the concave part.

3. The lens according to the claim 1, wherein in the direction from the first end to the second end, included angles between the extension surfaces and the axis of the lens body are gradually increased, wherein a minimum included angle between the extension surfaces and the axis of the lens body is less than 45 degrees, and a maximum included angle between the extension surfaces and the axis of the lens body is greater than 45 degrees.

4. The lens according to the claim 1, wherein the upper end surface is a convex surface protruding toward the second end; or
   the upper end surface is a plane.

5. The lens according to the claim 1, wherein the groove wall is a light transmitting groove wall, and the light incident component further comprises a reflecting surface located at a side of the light source accommodation groove.

6. The lens according to the claim 5, wherein the reflecting surface is located between the light source accommodation groove and the side wall of the lens body, or the reflecting surface is a portion of the side wall of the lens body.

7. The lens according to the claim 6, wherein the reflecting surface is located between the light source accommodation groove and the side wall of the lens body, a lower end surface, located at the first end, of the light incident component is a convex installing surface.

8. A lighting module, comprising:
   a lens, a light source arranged at a first end of the lens, and
   a substrate for fixing the light source, wherein the lens comprises a lens body, provided with a first end and a second end which are opposite to each other and a side wall located between the first end and the second end, wherein a light source of the lighting module is arranged at the first end, and at least a portion of the side wall is configured as a light emitting component;
   a light incident component, wherein the light incident component comprises a light source accommodation groove for accommodating the light source, the light source accommodation groove comprises a groove wall located at a side portion and an upper end surface towards the second end, the upper end surface is a rotation surface disposed in a manner that a line rotates around an axis of the lens body, and one end of the line is located on the axis of the lens body, arranged at the first end of the lens body, wherein the light incident component irradiates light emitted by the light source to the second end; and a light reflecting component, arranged at the second end of the lens body, wherein the light reflecting component comprises a concave part with an inner surface being a sawtooth surface, the concave part is concave from the first end to the second end, a cross-section of the inner surface of the concave part from the axis to the side wall is first concave up towards the second end of the lens body and then concave down towards the first end of the lens body, the sawtooth surface comprises a plurality of extension surfaces surrounding the axis of the lens body and sequentially intersecting, at least one of the extension surfaces extends in a direction from the first end to the second end, and two adjacent extension surfaces totally reflect light from the light incident component to the light emitting component, wherein any light emitted by the light emitting component is refracted towards the first end, such that all the light is refracted towards the first end of the lens body.

9. A lighting lamp, comprising:
a lighting module,
a light emitting mask located above the lighting module,
a base under the lighting module,
a drive circuit arranged in the base, and
a lamp holder arranged below the base and electrically connected with the lighting module,
wherein the lighting module comprises:
a lens,
a light source arranged at a first end of the lens, and
a substrate for fixing the light source, wherein the lens comprises:
a lens body, provided with a first end and a second end which are opposite to each other and a side wall located between the first end and the second end, wherein a light source of the lighting lamp is arranged at the first end, and at least a portion of the side wall is configured as a light emitting component;

a light incident component, wherein the light incident component comprises a light source accommodation groove for accommodating the light source, the light source accommodation groove comprises a groove wall located at a side portion and an upper end surface towards the second end, the upper end surface is a rotation surface disposed in a manner that a line rotates around an axis of the lens body, and one end of the line is located on the axis of the lens body, arranged at the first end of the lens body, wherein the light incident component irradiates light emitted by the light source to the second end; and a light reflecting component, arranged at the second end of the lens body, wherein the light reflecting component comprises a concave part with an inner surface being a sawtooth surface, the concave part is concave from the first end to the second end, a cross-section of the inner surface of the concave part from the axis to the side wall is first concave up towards the second end of the lens body and then concave down towards the first end of the lens body, the sawtooth surface comprises a plurality of extension surfaces surrounding the axis of the lens body and sequentially intersecting, at least one of the extension surfaces extends in a direction from the first end to the second end, and two adjacent extension surfaces totally reflect light from the light incident component to the light emitting component, wherein any light emitted by the light emitting component is refracted towards the first end, such that all the light is refracted towards the first end of the lens body, and wherein the lens is located between the light emitting mask and the base and assembled to the light emitting mask and the base respectively or the lens is located in the light emitting mask.

* * * * *